Jan. 4, 1944.  T. I. PRZYSIECKI  2,338,257
CLUTCH MECHANISM
Filed Feb. 27, 1942  2 Sheets-Sheet 1

INVENTOR
THEODORE I. PRZYSIECKI
ATTORNEY

Jan. 4, 1944.  T. I. PRZYSIECKI  2,338,257
CLUTCH MECHANISM
Filed Feb. 27, 1942  2 Sheets-Sheet 2

INVENTOR
THEODORE I. PRZYSIECKI

*J. H. B. Whitfield*
ATTORNEY

Patented Jan. 4, 1944

2,338,257

UNITED STATES PATENT OFFICE 2,338,257

CLUTCH MECHANISM

Theodore I. Przysiecki, Elmwood Park, Ill., assignor to Teletype Corporation, Chicago, Ill., a corporation of Delaware Application February 27, 1942, Serial No. 432,595

16 Claims. (Cl. 178—53.1)

The present invention relates to printing telegraph apparatus and more particularly to clutch drive mechanisms therefor.

The principal object of the present invention is to provide a frictionally driven coupling apparatus in which the load upon a continuously operating driving motor, which supplies the power, and the wear upon the friction elements of the clutch coupling, are relieved during idle conditions without impairment to the efficiency or to the instantaneous responsiveness of the driving power.

In the attainment of the above and other objects, the present invention features in its fundamental embodiment, a continuously rotatable motor driven shaft having positive clutch connection with a driving auxiliary that is integrally associated with the driving element of a friction coupling. The positive clutch is supervised for single revolution operation under the control of a code signal distributor cam assembly and is arranged to start the cycle of rotation in advance of the cyclic instant that the frictionally driven auxiliary element of the function coupling is required to start its movement.

A printing mechanism comprising a member which is rotated through a complete circle of character printing positions is driven through the friction couplings and after the latter has completed its cycle of operation, the positive clutch coupling is automatically disengaged to arrest the driving member of the friction coupling and to avert wear between the driving and driven members thereof during the time that the printing mechanism is idle and awaiting a subsequent supervisory or character printing signal. Thereafter and upon the reception of a permutation code signal, the positive clutch coupling is again initiated into rotation in advance of the time that the friction coupling is required to start its rotation so as to assure that the selecting cycle which is powered through the friction coupling may be fully consummated before a control or primary shaft is brought to rest.

For a more comprehensive understanding of the present invention, reference may be had to the accompanying drawings and to the following detailed specification wherein similar reference characters designate corresponding parts throughout and wherein.

Figure 1:
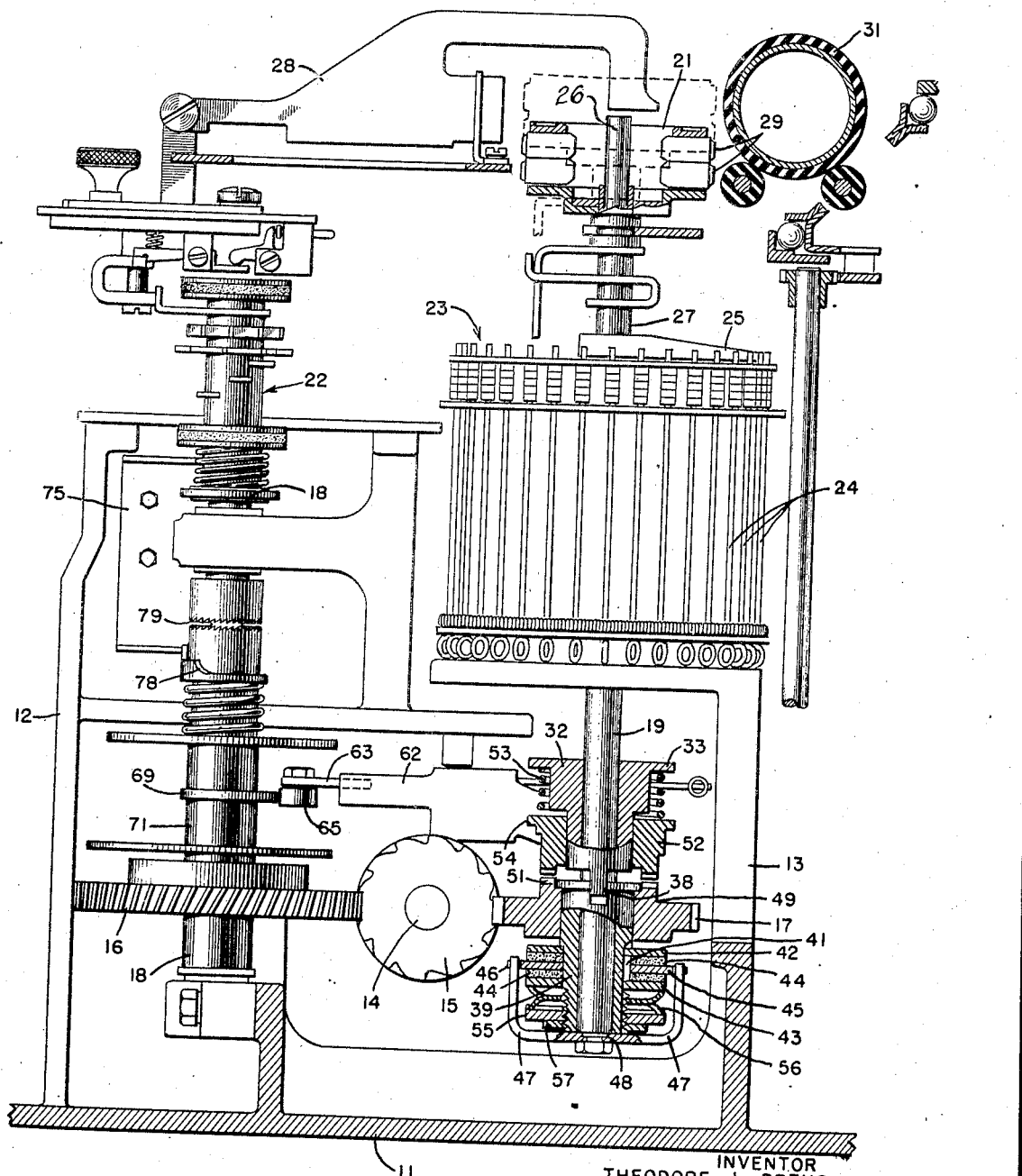
Fig. 1 is a side sectional view through a type wheel printing mechanism having embodied therein certain features incorporating the present invention.

Referring now more specifically to the accompanying drawings the reference character 11 denotes generally a supporting base having integrally cast therewith upstanding supporting wall sections 12 and 13 on which are formed various embossments that provide journal bearings and afford general support to the printing mechanism and operating structure.

In the particular structure specifically contemplated in accordance with the drawings, power originates at the continuously rotating motor shaft 14 and is therefrom transmitted by means of a driving worm 15 to each of a pair of vertical axis driven gears 16 and 17, the former of which is of somewhat larger diameter than is the latter, so that accordingly, it is to be understood that the speed of rotation of its shaft 18 is correspondingly slower than that of shaft 19 which carries the type wheel 21.

In systems of this class, which are operated under the supervision of start-stop permutation code signals, the component impulses of each of the signals are distributed by means of a cam assembly 22, through a series of transfer elements to a set of code bars contained in the pin barrel selector assembly 23, Fig. 1. The latter member consists of a cylindrical arrangement of pins 24 each one of which is individually and exclusively responsive to a permutation arrangement of impulses comprising each signal. In response to its signal, a selector pin 24 moves inwardly out of circular alignment with the rest of the pins 24 and into the path of a stop arm 25 whose extremity is adapted to revolve about a shorter radius just clear of the circular arrangement of pins 24, but so as to be encountered by any one of said pins 24 when it is moved inwardly into the selected condition.

In the specific contemplation of apparatus illustrated, the type wheel 21 is integrally associated with a shaft 26 which is splined to a sleeve 27 so as to be shiftable longitudinally thereof, but rotatable together with said sleeve 27 to the latter of which there is secured the above-mentioned stop arm 25. Accordingly, in accordance with the permissive movements of said arm 25, sleeve 27 rotates from one angular position to another and carries with it the splined concentric shaft 26 to which the type wheel 21 is secured, correspondingly positioning a certain type character of said wheel 21 in printing positions according to selections as determined by the movements of the cylindrical pins 24. Following this, the print hammer 28 is operated moving rightwardly as viewed in Fig. 1 and thrusting a particular type pallet 29 into contactual engagement with a print ribbon (not shown), thrusting the latter against an intervening sheet of paper and the platen 31 as a supporting back. The movement of the type wheel 21, from one of its positions in accordance with a preceding selection to a new position, may, under some conditions, require that it rotate throughout a full revolution or even an amount slightly exceeding 360° so that for this reason provision is here made to rotate shaft 19 at a higher rate of speed so that it may have time to turn throughout a complete revolution before the positive tooth clutch elements now to be described are cyclically disengaged.

The type wheel shaft 19 may be an integral formation with the sleeve or hollow shaft 27. It is freely rotatable within the cam bushing 32 the top surface of which is formed, see Fig. 3, as a detentable disc or cam 33 and against its peripheral surface there constantly engages a follower roller 34 mounted on a second class lever 35 pivoted at 36 and continuously urged in a clockwise direction by the spring 37. Bushing 32 is provided at its lowermost extremity with opposite downwardly extending tongues 38 that rest within correspondingly proportioned slots in a driven sleeve member 39. The latter member is screw threaded near its lowermost outer periphery as best indicated in Fig. 1 and is provided longitudinally of the threaded section with a keyway 41. Within the latter there is designed to extend integral tongues of the pair of driving discs 42 and 43. Between the driving discs 42 and 43 are a pair of friction discs 44 of fibrous material, such as felt, and between these is disposed a driven disc 45 slotted at diametrically opposite places in its periphery designated 46 for the reception thereat of a pair of vertically extending arms 47 secured at 48 to the type wheel shaft 19.

The driven gear 17, described above, is integrally formed with a driving clutch bushing 49 radially serrated as at 51 to fit into spaces between similar serrations in a driven bushing 52 keyed in a suitable manner to the aforedescribed cam detentable bushing 32 for brief longitudinal movement so as to be rotatable therewith but, nevertheless, longitudinally slidable thereon under the influence of a coil spring 53 which urges between the flange cam 33 and a flange formation 54 of bushing 52.

It will be understood, accordingly, that as driving worm 15 imparts counterclockwise (Fig. 3) movement to the driven gear 17, similar rotation is imparted by the latter through its clutch serrations 51 to the driven bushing 52 which in turn causes corresponding rotation on the part of sleeve 32 and through its driving tongues 38 to the lowermost sleeve 39. Sleeve 39 carries with it the two driving discs 42 and 43 but thereat rotary motion is imparted frictionally through the discs 44 to the driven disc 45. When sufficient resistance to motion on the part of shaft 19 is encountered, slippage may occur between the driven disc 45 and its adjacent driving disc 44, and the amount of friction between discs 44 and disc 45 may be varied by adjusting the position of nut 55 which bears against a petaliferous tension spring 56. This adjustment, when once established, is secured by the check action of a lock nut 57 that is screw threaded upon the extremity of bushing 39. Shaft 19, it is understood, is therefore frictionally driven through the coupling comprising the elements 42 to 45, but only when positive tooth clutch engagement is effected between the serrated bushing 49 of driven gear 17 and the cooperating portion of driven bushing 52. This positive tooth clutch engagement is permitted to obtain for limited periods of time only as will now be described.

Figure 2:
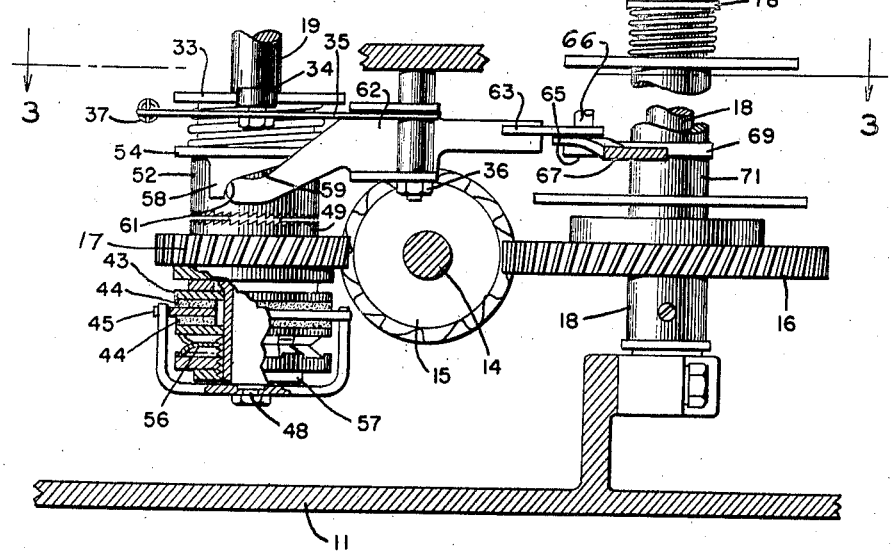
Fig. 2 is a fragmentary side sectional view of the apparatus featured in Fig. 1 but here viewed from the opposite side.

The cylindrical periphery of driven clutch member 52 has formed thereon a specially shaped peripheral embossment 58 best indicated in Fig. 2. This formation provides an inclined cam surface 59 on the leading edge of the embossment (as the driven member 52 is rotated by the driving member 49) curving gradually from the flange formation 54 and ending with an abrupt small-radius curvature as at 61 that offers an abrupt abutment to a correspondingly profiled extremity of a pivoted trip lever 62. In accordance with the instant illustration, lever 62 is shown formed of sheet material with journal ends struck and upturned to straddle the bushing or bearing journal associated with detent lever 35 and also pivoted upon the latter member's journal pin 36 which is anchored in a suitable part of the supporting casting 11.

Figure 3:
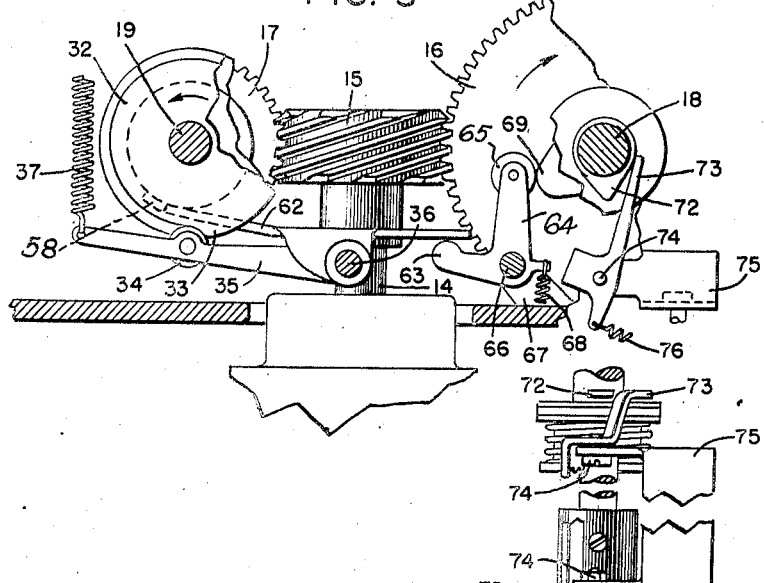
Fig. 3 is a fragmentary plan sectional view taken approximately on line 3—3 of Fig. 2.

The tail of lever 62 is acted upon by one arm 63 of a bell crank lever whose other arm 64 supports a follower roller 65, Fig. 3, and which is pivoted at 66 upon a sidewardly jutting formation 67 of the structural framework. Bell crank member 63—64 is urged by a spring 68 in a clockwise direction, Fig. 3, about its pivot 66 so that follower roller 65 pursues the peripheral contour of a cam 69 integrally associated with an assembly bushing 71.

Cam assembly bushing 71 is adapted to turn idly upon shaft 18, Fig. 2, but it is released for rotation once during each code combination signal and is thereafter arrested under the supervision of a control cam 72, Fig. 2, which forms a part of the cam assembly 22, described above as associated with the selector apparatus. Cam projection 72 rotating with assembly 22 encounters a follower arm of a cradle lever 73 pivoted on the trunnions 74 of a supporting bracket 75 suitably anchored to the supporting walls 12, Fig. 1.

The cradle lever 73 is urged counterclockwise about its trunnion pivot 74 under the influence of a spring 76, Fig. 3, and its lowermost extremity designated 77 extends downwardly and horizontally into the path of a peripheral embossment 78 of a positive tooth clutch driven element 79 after the manner of association between lever 62 and clutch element 52 having the embossment 58, afore-described.

In its prevalent condition, as illustrated in Figs. 2 and 3, cradle lever 73 is disposed so that its lowermost extremity 77 lies in the path of the peripheral embossment 78 in which condition it will effect the disengagement between the driving and driven elements of clutch 79 pending the release operation which occurs when cam 72 encounters the follower extremity of crade lever 73. When cam projection 72 encounters and passes extremity 73, the cradle lever is permitted to resume its original condition, meanwhile clutch 79, having been permitted to become coupled, effects a revolution of operation on the part of cam assembly sleeve 71. During this cycle, several periodic functions incident to the operation of the printing mechanism are consummated, such as the operation of the printing bail, the tripping of lever 62, etc. The incorporation of cam 69 as one of the elements of assembly 71 accordingly renders the function of tripping clutch 49—52 as one of the single revolution performances incident to each signal operation.

The manner in which the selector cam assembly 22 is controlled and operated by the single line magnet is more fully described and illustrated in U. S. Patent No. 2,247,408 issued to A. H. Reiber under date of July 1, 1941. Accordingly, it follows that since the selector cam assembly 22 is cyclically initiated into rotation and since it, through cam projection 72 controls the single revolution operation of clutch 79, the latter member's cam 69, acting through the series of levers 63—64 and 62, effects a corresponding single revolution performance on the part of the positive tooth clutch 49—52. By reason of this fact, positive tooth clutch 49—52 is held disconnected during the idle moments of transmission when the motor is operating but no signals are being transmitted thereby saving wear upon the friction clutch assembly 42—45 by permitting the latter member to be operated solely during the brief interval when the rotation of the type wheel shaft 19 is essential to the movement of the type wheel 21 from a preceding selected condition to a succeeding one.

By providing that driven gears 16 and 17 have different ratios with respect to driving worms 15 as indicated, the rotation of shaft 19 may accordingly be initiated during an instant in the cycle somewhat later than the instant of initiation of the selector cam assembly 22 and still have time to overtake that member and complete a full revolution of the type wheel, which as already explained may be essential in moving it from certain predetermined printing characters to other ones, and to complete this performance before clutch 49—52 is disconnected through the intervention of control lever 62.

While the present invention has been explained and described with reference to a specific contemplation of structure, it is to be understood nevertheless that numerous modifications and variations may be incorporated without departing from the spirit or scope thereof. Accordingly, it is not intended to be limited by any of the specific language used in the foregoing detailed description nor by the particulars of the accompanying illustrations except as indicated in the hereunto appended claims.

What is claimed is:

1. In a printing telegraph apparatus, a selector mechanism, an intermittently rotatable type wheel shaft disposed to be arrested in various angular positions under the control of said selector mechanism, a continuously rotatable shaft, a positive drive clutch coupling driven by said continuously rotatable shaft, a friction clutch coupling driven by said positive drive clutch coupling, means under the control of said frictional clutch coupling for imparting rotation to said intermittently rotatable shaft, and means for disconnecting the elements of said positive drive clutch coupling after each operation of said selector mechanism.

2. In a start-stop telegraph controlled apparatus, a driven shaft, means for arresting said shaft in any of a plurality of various angular positions in response to received permutation code signals, a frictional driving connection for communicating power from a continuously operating source of rotary power to said shaft, and means comprising a clutch member and a disengagement element therefor for relieving the frictional driving load from said continuously operating source during intervals when no code signals are received.

3. In combination, a telegraph signaling apparatus, a selector mechanism, a rotatable shaft disposed to be arrested in different positions under the control of said selector mechanism, a continuously rotating power shaft, a positive engagement coupling driven by said power shaft, a friction coupling driven by said positive engagement coupling, means under the control of said frictional coupling for imparting rotation to said rotatable shaft, and rotary means controlled by said signaling apparatus for opening said positive engagement coupling cyclically.

4. In a start-stop apparatus, a driven shaft, means for arresting said shaft in a plurality of various angular positions, a rotary driving member, a frictional driving connection for communicating power from said driving member to said shaft, and means for arresting said driving member periodically after said frictional connection is driving and for releasing said driving member to rotation before said frictional connection is caused to slip.

5. In combination, a rotary shaft carrying a cylindrical type wheel for arrestment in various angular positions, a selector responsive to successive code signals for accordingly arresting said shaft in its various positions, a slip clutch for imparting rotation yieldingly to said shaft, a second clutch for imparting rotation to said slip clutch, and means under the cyclic control of said selector for supervising the operation of said second clutch.

6. A start-stop controlled shaft comprising in combination, a driving portion and a driven portion having frictional coupling engagement therebetween, a continuous power source, a positive clutch coupling connection between said source and said driving portion, a start-stop signal supervised mechanism, and means under the control of said mechanism for effecting coupling engagement through said positive coupling means cyclically to impart rotation to said driving portion for limited engagement intervals.

7. In a rotary type wheel selector apparatus, a principal type carrying shaft, a pin barrel selector mechanism responsive to telegraph signals including means for arresting said shaft in any predetermined of a number of angular positions, a frictional driving medium for imparting rotation yieldably to said shaft, a positive clutch coupling for imparting rotation positively from a continuous source of power to said friction coupling, and means for effecting engagement of said positive clutch coupling periodically and for limited intervals only coincident with received telegraph signals.

8. In a printing telegraph mechanism controlled by code signals, a type wheel, a shaft for carrying said type wheel, a continuously rotatable power shaft, a friction clutch connecting said power and type wheel carrying shafts, means for arresting said type wheel carrying shaft in any of a plurality of different angular positions for correspondingly disposing said type wheel, and a single revolution driving medium actuated by said power shaft for imparting rotation to said power shaft for limited periods of time coincident with code signal reception.

9. In combination with a printing telegraph mechanism including a type wheel, a shaft for carrying said type wheel, a continuously rotatable power shaft for actuating said type wheel carrying shaft, means including a yieldable coupling for enabling the arrest of said type wheel carrying shaft in any of a plurality of different angular positions for correspondingly disposing said type wheel, and a single revolution driving medium for imparting rotation through said friction clutch for limited periods of time coincident with permutation code signal reception.

10. In a start-stop printing telegraph system, a code impulse signal distributing apparatus comprising a rotary member cyclically released for rotation under the supervision of one impulse of a code signal and arrested coincident with the final impulse of each said signal, a rotatable type wheel having a plurality of type characters and arrestable in various angular positions corresponding to the permutation code signals received over a line, a frictional driving connection for imparting yieldable rotation to said type wheel, and a positive clutch means for imparting cyclic rotation to said frictional connection coincident with intervals of signal reception.

11. Telegraphically controlled apparatus including a friction clutch for imparting rotation to an element to be arrested in any of a plurality of angular positions, a positive tooth clutch for imparting rotation to said friction clutch, and permutation code signal supervised means for effecting clutch engagement of said positive tooth clutch for limited intervals only of operation.

12. In a telegraph system, a signal impulse distributing apparatus comprising a member cyclically released for rotation under supervision of a start impulse of a signal and arrested coincident with the final impulse of each signal, a wheel having a plurality of characters and arrestable in various angular positions in correspondence with the supervision of permutation of code signals received over a line, a frictional driving coupling for imparting yieldable rotation to said wheel, and a positive clutch means for imparting rotation to said friction coupling cyclically.

13. In a printing telegraph apparatus, a rotatable type wheel, a shaft for supporting said type wheel, a shaft for distributing impulses in accordance with the signals incoming over a line, a selector mechanism conditioned by the operation of said distributing shaft, a source of power for imparting rotation to said type wheel shaft and including a positive clutch coupling and a frictional clutch coupling, means under the supervision of said selector mechanism for resisting rotation through said frictional clutch coupling, and means under the control of said distributor shaft for disconnecting said positive clutch coupling following each telegraph signal interval and thereby arresting rotation of said frictional clutch coupling.

14. In a telegraph printing apparatus, a start-stop distributor shaft having cyclic rotation under the control of a line relay armature, a type wheel carrying shaft having variable angular rotation according to the chance occurrences of successive printing positions, a source of power for imparting rotation to said type wheel carrying shaft having in series a positive clutch coupling and a frictional clutch coupling, means under the control of permutation code signals distributed by said distributor shaft for controlling the effectiveness of said frictional clutch coupling, and means also under the control of said distributor shaft for determining the period of operation of said positive clutch coupling.

15. In a printing telegraph apparatus, a type wheel carrying shaft, a source of operating power, a driving train between said source of power and said type wheel shaft including in series a positive clutch coupling and a frictional clutch coupling, a start-stop distribution shaft including cam means for determining the period of engagement of said positive clutch coupling, and a selector apparatus conditioned in accordance with telegraph signals distributed by said distributor shaft for determining the period of engagement of said frictional clutch coupling.

16. In a printing telegraph apparatus, a rotary selector mechanism comprising a circular arrangement of stop pins, a rotatable member under the control of said stop pins, frictional driving means for imparting rotation to said member for advancing it from one position to another in accordance with the cyclic disposition of said stop pins, a positive clutch coupling for imparting rotation through said frictional driving means during limited intervals of a selecting cycle, and a distributor shaft including cam means for determining the duration of a cyclic period of engagement of said positive clutch coupling and signal transfer means for conditioning said pins and thereby determining an interval within said duration during which there is effected engagement of said frictional clutch coupling.

THEODORE I. PRZYSIECKI.